(12) United States Patent
Baba

(10) Patent No.: US 11,608,041 B2
(45) Date of Patent: Mar. 21, 2023

(54) BRAKING CONTROL SYSTEM, BRAKING CONTROL METHOD, AND PROGRAM

(71) Applicant: Toyota Jidosha Kabushiki Kaisha, Toyota (JP)

(72) Inventor: Takeshi Baba, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 109 days.

(21) Appl. No.: 17/382,882

(22) Filed: Jul. 22, 2021

(65) Prior Publication Data
US 2022/0032888 A1 Feb. 3, 2022

(30) Foreign Application Priority Data
Jul. 28, 2020 (JP) .............................. JP2020-127646

(51) Int. Cl.
*B60T 8/32* (2006.01)
*B60T 8/171* (2006.01)

(52) U.S. Cl.
CPC .............. *B60T 8/321* (2013.01); *B60T 8/171* (2013.01); *B60T 2201/024* (2013.01); *B60T 2210/32* (2013.01)

(58) Field of Classification Search
CPC .... B60T 8/321; B60T 8/171; B60T 2201/024; B60T 2210/32
See application file for complete search history.

(56) References Cited

U.S. PATENT DOCUMENTS

| 2007/0152803 A1* | 7/2007 | Huang ................... B60Q 1/535 340/435 |
| 2019/0217861 A1 | 7/2019 | Kurahashi |
| 2019/0315343 A1 | 10/2019 | Steffey et al. |

FOREIGN PATENT DOCUMENTS

| CN | 109664882 A | 4/2019 |
| JP | 2010-052546 A | 3/2010 |
| JP | 2010052546 A * | 3/2010 |

OTHER PUBLICATIONS

Machine Translation of JP-2010052546-A (Year: 2010).*

* cited by examiner

*Primary Examiner* — Faris S Almatrahi
*Assistant Examiner* — Andrew J Cromer
(74) *Attorney, Agent, or Firm* — Dinsmore & Shohl LLP

(57) ABSTRACT

A braking control system includes obstacle detection means for detecting an obstacle ahead of a vehicle, first collision determination means for determining whether the vehicle would collide with the obstacle ahead of the vehicle, following vehicle detection means for detecting a following vehicle traveling behind the vehicle, information acquisition means for acquiring a maximum deceleration set in the following vehicle, second collision determination means for determining whether the following vehicle would collide with the vehicle based on the maximum deceleration, and braking control means for controlling braking means of the vehicle so that an absolute value of a deceleration of the vehicle does not exceed an absolute value of the maximum deceleration of the following vehicle when the first collision determination means determines that the vehicle would collide with the obstacle and the second collision determination means determines that the following vehicle would collide with the vehicle.

7 Claims, 8 Drawing Sheets

BRAKING CONTROL SYSTEM, BRAKING CONTROL METHOD, AND PROGRAM

CROSS REFERENCE TO RELATED APPLICATIONS

This application is based upon and claims the benefit of priority from Japanese patent application No. 2020-127646, filed on Jul. 28, 2020, the disclosure of which is incorporated herein in its entirety by reference.

BACKGROUND

The present disclosure relates to a braking control system, a braking control method, and a program which brake a vehicle.

There is a known braking control apparatus for braking a vehicle on which the braking control apparatus is mounted, when a collision with an obstacle ahead of the vehicle is predicted and a following vehicle is detected at a time earlier than when the following vehicle is detected (see, for example, Japanese Unexamined Patent Application Publication No. 2010-052546).

SUMMARY

Incidentally, even if a driver of the following vehicle noticed the braking of the vehicle ahead and braked, there is a possibility that the following vehicle may not brake in time and the following vehicle would collide with the vehicle. In order to avoid such a situation, it is desirable to more reliably prevent such a collision of the following vehicle with the vehicle.

The present disclosure has been made to solve such a problem and an object thereof is to provide a braking control system, a braking control method, and a program which can more reliably prevent a following vehicle from colliding with a vehicle by braking the vehicle.

An example aspect of the present disclosure to achieve the above object is a braking control system including:

obstacle detection means for detecting an obstacle ahead of a vehicle;

first collision determination means for determining whether or not the vehicle would collide with the obstacle ahead of the vehicle based on a result of the detection from the obstacle detection means;

following vehicle detection means for detecting a following vehicle traveling behind the vehicle;

information acquisition means for acquiring information about a maximum deceleration set in the following vehicle;

second collision determination means for determining whether or not the following vehicle would collide with the vehicle based on the result of the detection from the following vehicle detection means and the information about the maximum deceleration of the following vehicle acquired by the information acquisition means; and braking control means for controlling braking means of the vehicle so that an absolute value of a deceleration of the vehicle does not exceed an absolute value of the maximum deceleration of the following vehicle acquired by the information acquisition means when the first collision determination means determines that the vehicle would collide with the obstacle and the second collision determination means determines that the following vehicle would collide with the vehicle.

In this example aspect, when the first collision determination means determines that the vehicle would collide with the obstacle and the second collision determination means determines that the following vehicle would collide with the vehicle, the braking control means may set the absolute value of the maximum deceleration of the vehicle to be equal to or less than the absolute value of the maximum deceleration of the following vehicle acquired by the information acquisition means.

In the above example aspect, when the first collision determination means determines that the vehicle would collide with the obstacle, the second collision determination means determines that the following vehicle would collide with the vehicle, and the following vehicle detection means detects a plurality of the following vehicles traveling behind the vehicle, the braking control means may select a smallest maximum deceleration among the absolute values of the maximum decelerations of the following vehicles, and set the selected maximum deceleration as the maximum deceleration of the vehicle.

In the above example aspect, jumping-out determination means for determining whether or not the obstacle ahead of the vehicle detected by the obstacle detection means is jumping out in front of the vehicle is further included. When the first collision determination means determines that the vehicle would collide with the obstacle, the second collision determination means determines that the following vehicle would collide with the vehicle, and the jumping-out determination means determines that the obstacle has jumped out, the braking control means may control the braking means of the vehicle so that the absolute value of the deceleration of the vehicle does not exceed the absolute value of the maximum deceleration of the following vehicle acquired by the information acquisition means and may also perform at least one of the following two types of control: one type of the control is for controlling a warning apparatus to issue a warning to the obstacle which has jumped out; and another type of the control is for operating a steering apparatus so as to automatically avoid the obstacle which has jumped out.

Another example aspect of the present disclosure to achieve the above object may be a braking control method including:

detecting an obstacle ahead of a vehicle;

determining whether or not the vehicle would collide with the obstacle ahead of the vehicle based on a result of the detection;

detecting a following vehicle traveling behind the vehicle;

acquiring information about a maximum deceleration set in the following vehicle;

determining whether or not the following vehicle would collide with the vehicle based on the result of the detection and the acquired information about the maximum deceleration of the following vehicle; and controlling braking means of the vehicle so that an absolute value of a deceleration of the vehicle does not exceed an absolute value of the acquired maximum deceleration of the following vehicle when it is determined that the vehicle would collide with the obstacle and that the following vehicle would collide with the vehicle.

Another example aspect of the present disclosure to achieve the above object may be a program for causing a computer to execute processing of:

detecting an obstacle ahead of a vehicle;

determining whether or not the vehicle would collide with the obstacle ahead of the vehicle based on a result of the detection;

detecting a following vehicle traveling behind the vehicle;

acquiring information about a maximum deceleration set in the following vehicle;

determining whether or not the following vehicle would collide with the vehicle based on the result of the detection and the acquired information about the maximum deceleration of the following vehicle; and controlling braking means of the vehicle so that an absolute value of a deceleration of the vehicle does not exceed an absolute value of the acquired maximum deceleration of the following vehicle when it is determined that the vehicle would collide with the obstacle and that the following vehicle would collide with the vehicle.

According to the present disclosure, it is possible to provide a braking control system, a braking control method, and a program which can more reliably prevent a following vehicle from colliding with a vehicle by braking the vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
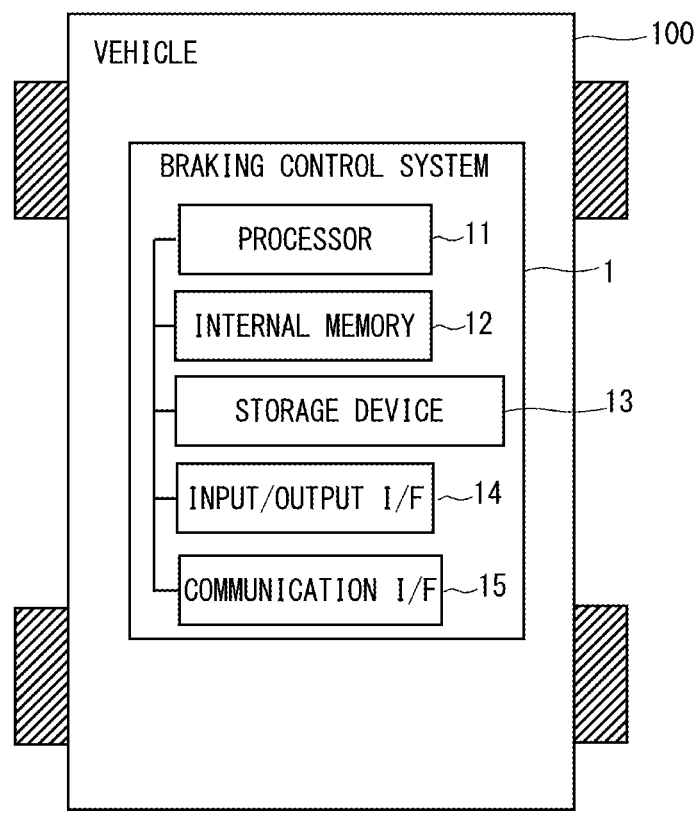
FIG. 1 shows a braking control system mounted on a vehicle.

Embodiments of the present disclosure will be described below with reference to the drawings. As shown in FIG. 1, a braking control system 1 according to a first embodiment is mounted on a vehicle 100 and controls braking of the vehicle 100.

The braking control system 1 controls braking of the vehicle 100 so as to prevent a following vehicle traveling behind the vehicle 100 from colliding with the vehicle 100 when braking the vehicle 100 in order to avoid a collision with an obstacle ahead of the vehicle 100 at, for example, an intersection with a blind spot or at a point where a platoon of vehicles merges to a main road.

The braking control system 1 has a hardware configuration of an ordinary computer including, for example, a processor 11 such as a CPU (Central Processing Unit) or a GPU (Graphics Processing Unit), an internal memory 12 such as a RAM (Random Access Memory) or a ROM (Read Only Memory), a storage device 13 such as an HDD (Hard Disk Drive) or an SDD (Solid State Drive), an input/output I/F 14 for connecting peripheral devices such as a display, and a communication I/F 15 for communicating with devices outside the apparatus.

In the braking control system 1, for example, the processor 11 executes a program stored in the storage device 13, the internal memory 12, or the like while utilizing the internal memory 12, so that the functions of each of the units described later can be implemented.

Figure 2:
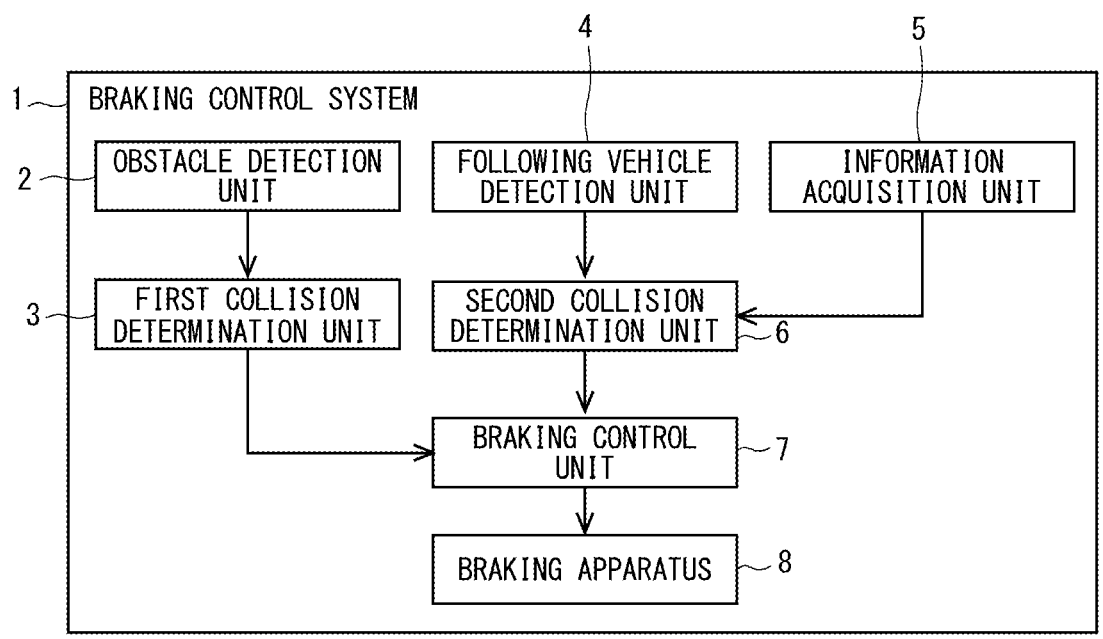
FIG. 2 is a block diagram showing a schematic system configuration of a braking control system according to the first embodiment.

FIG. 2 is a block diagram showing a schematic system configuration of the braking control system according to the first embodiment. The braking control system 1 according to the first embodiment includes an obstacle detection unit 2, a first collision determination unit 3, a following vehicle detection unit 4, an information acquisition unit 5, a second collision determination unit 6, a braking control unit 7, and a braking apparatus 8.

The obstacle detection unit 2 is a specific example of obstacle detection means. The obstacle detection unit 2 detects an obstacle ahead of the vehicle 100. The obstacle detection unit 2 is composed of a millimeter wave radar, an ultrasonic sensor, a camera, and so on provided in a front part of the vehicle 100.

For example, the obstacle detection unit 2 includes a transmitter and a receiver. The transmitter transmits millimeter waves for detecting an object toward the front of the vehicle 100. The receiver receives reflected millimeter waves which are the millimeter waves reflected on the object. The obstacle detection unit 2 is configured to calculate and detect a distance between the vehicle 100 and the obstacle ahead of the vehicle 100 and a relative speed by sequentially measuring the time from the transmission of the millimeter waves to the reception of the reflected waves, and to output an electric signal indicating the detection result to the first collision determination unit 3.

Examples of the obstacles that can be detected by the obstacle detection unit 2 include a leading vehicle traveling ahead of the vehicle 100, a vehicle crossing ahead of the vehicle 100, a parked vehicle ahead of the vehicle 100, a stationary object, a pedestrian, and a bicycle. The obstacle detection unit 2 may detect the obstacle ahead of the vehicle 100 based on information acquired by the information acquisition unit 5. The information acquired by the information acquisition unit 5 includes GPS (Global Positioning System) information indicating a position of the obstacle.

The first collision determination unit 3 is a specific example of first collision determination means. The first collision determination unit 3 determines whether or not the vehicle 100 would collide with the obstacle ahead based on the detection result from the obstacle detection unit 2.

The first collision determination unit 3 determines whether or not there is a high possibility that the vehicle 100 would collide with the obstacle based on, for example, the distance between the obstacle detected by the obstacle detection unit 2 and the vehicle 100 and the relative speed. If the first collision determination unit 3 determines that there is a high possibility that the vehicle 100 would collide with the obstacle, the first collision determination unit 3 outputs a first collision signal indicating the determination result to the braking control unit 7.

The following vehicle detection unit 4 is a specific example of following vehicle detection means. The following vehicle detection unit 4 detects a vehicle traveling behind the vehicle 100. The following vehicle detection unit 4 has the same configuration as that of the obstacle detection unit 2. The following vehicle detection unit 4 is composed of a millimeter-wave radar, an ultrasonic sensor, a camera, and so on provided in a rear part of the vehicle 100.

The following vehicle detection unit 4 may detect the following vehicle based on the information acquired by the information acquisition unit 5. The information acquired by the information acquisition unit 5 includes GPS information and the like of the following vehicle. The following vehicle detection unit 4 is configured to calculate and detect, for example, the distance between the vehicle 100 and the following vehicle and the relative speed, and output an electric signal indicating the detection result to the second collision determination unit 6.

Figure 3:
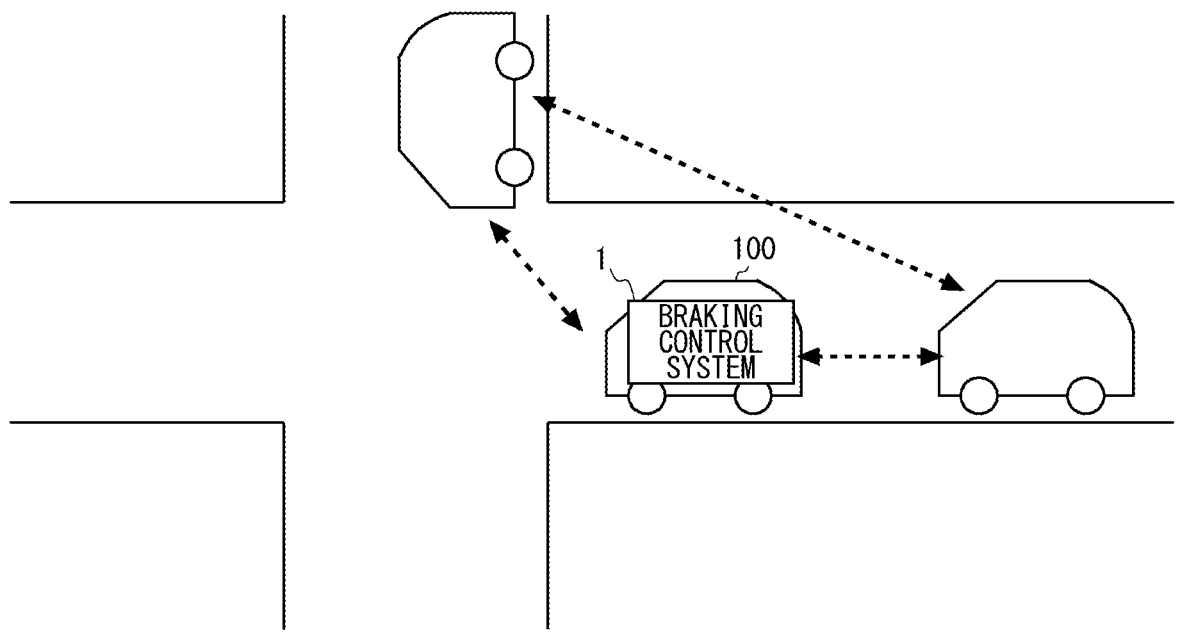
FIG. 3 shows vehicle-to-vehicle communication.
Figure 4:
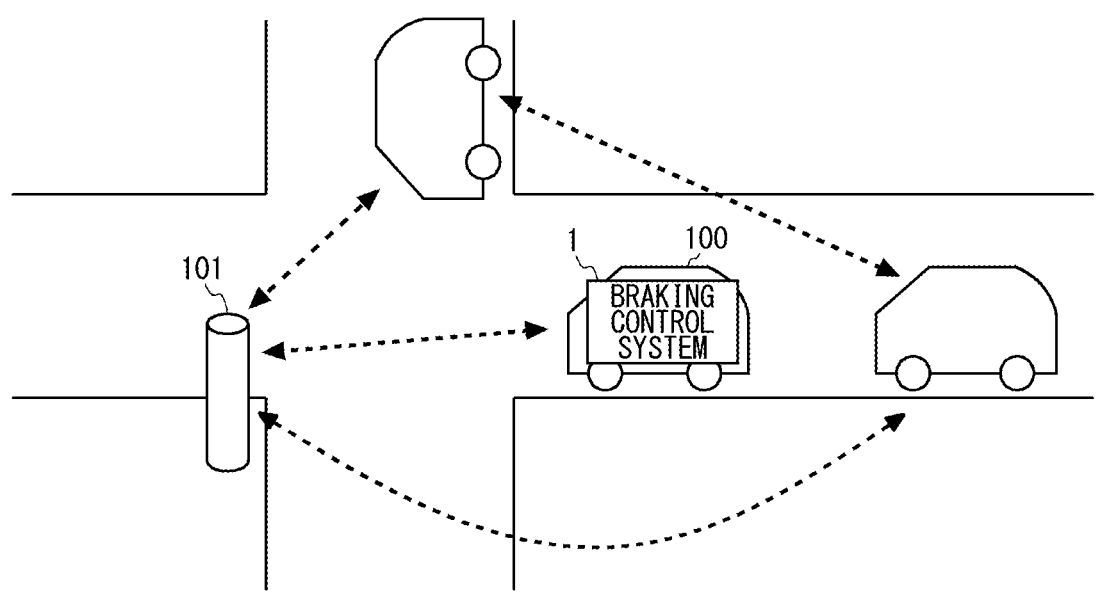
FIG. 4 shows vehicle-to-roadside-infrastructure.

The information acquisition unit 5 is a specific example of information acquisition means. The information acquisition unit 5 is configured as a wireless communication apparatus for transmitting and receiving information via wireless communication. The information acquisition unit 5 can acquire information about the surroundings of the vehicle 100 by, for example, performing Vehicle-to-Vehicle (V2V) communication, which is communication between vehicles as shown in FIG. 3, Vehicle-to-roadside-Infrastructure (V2I), which is communication between an infrastructure sensor 101 installed on the road and a vehicle as shown in FIG. 4, communication (V2N: Vehicle-to-cellular-Network) using 3G, 5G, or LTE (Long Term Evolution) models installed in the vehicle, communication between a vehicle and a pedestrian holding a smartphone (V2P: Vehicle-to-Pedestrian), and communication between a vehicle and a thing (V2X: Vehicle-to-everything).

When the following vehicle detection unit 4 detects the following vehicle, the information acquisition unit 5 acquires information about a maximum deceleration of the following vehicle from the following vehicle. The maximum deceleration is the maximum deceleration of each vehicle preset in the vehicle. The maximum deceleration is set in advance in the braking control unit 7 of each vehicle according to a safety function of the vehicle and capability of the braking apparatus 8. In the braking control unit 7 of each vehicle, for example, the maximum deceleration set in a safety function such as a PCS (Pre-Crush Safety System) mounted on the vehicle, or −0.15 G, which is a reference of the maximum deceleration in the case where there is a standing passenger in a bus is set.

During braking of each vehicle, the braking control unit 7 of the vehicle controls the braking apparatus 8 of the vehicle so that an absolute value of a deceleration of the vehicle does not exceed an absolute value of the set maximum deceleration. The information acquisition unit 5 outputs the acquired information about the maximum deceleration of the following vehicle to the second collision determination unit 6.

The second collision determination unit 6 is a specific example of second collision determination means. The second collision determination unit 6 determines whether or not the following vehicle would collide with the vehicle 100 based on the detection result from the following vehicle detection unit 4 and the information about the maximum deceleration of the following vehicle acquired by the information acquisition unit 5. For example, when the second collision determination unit 6 determines that the following inequality holds, it determines that there is a high possibility that the following vehicle would collide with the vehicle 100.

$$x \leq (b^2/(2\beta)+Bb)-(a^2/(2\alpha)+Aa)$$

In the above inequality, x represents a distance between the vehicle 100 and the following vehicle, a represents a current vehicle speed of the vehicle 100, α represents the maximum deceleration of the vehicle 100, A represents a free running time of the vehicle 100, b represents a current vehicle speed of the following vehicle, β represents the maximum deceleration of the following vehicle, and B represents a free running time of the following vehicle. $b^2/(2\beta)$ represents a braking distance of the following vehicle. $a^2/(2\alpha)$ represents the braking distance of the vehicle 100.

The second collision determination unit 6 can calculate a distance x between vehicles based on distance information of the following vehicle detected by the following vehicle detection unit 4. The second collision determination unit 6 can calculate the current vehicle speed b of the following vehicle based on the distance information of the following vehicle detected by the following vehicle detection unit 4 or the information acquired by the information acquisition unit 5. The maximum deceleration β and the free running time B of the following vehicle are information that can be acquired by the information acquisition unit 5. The free running times A and B may be values obtained in advance in an experiment or the like.

Although the first collision determination unit 3 and the second collision determination unit 6 are constituted as separate bodies, the present disclosure is not limited to this and instead they may be formed as an integral body. If it is determined that there is a high possibility that the following vehicle may collide with the vehicle 100, the second collision determination unit 6 outputs a second collision signal indicating the collision determination result to the braking control unit 7.

The braking control unit 7 is a specific example of braking control means. The braking control unit 7 controls the braking apparatus 8 of the vehicle 100 to brake the vehicle 100 based on the determination results of the first collision determination unit 3 and second collision determination unit 6. The braking apparatus 8 is a specific example of braking means. The braking apparatus 8 is composed of, for example, a disc brake apparatus provided on each wheel of the vehicle 100.

The braking control unit 7 controls the braking apparatus 8 so as to minimize the braking distance of the vehicle 100 while controlling the braking apparatus 8 so that the absolute value of the deceleration of the vehicle 100 does not exceed the preset absolute value of the maximum deceleration.

Figure 5:
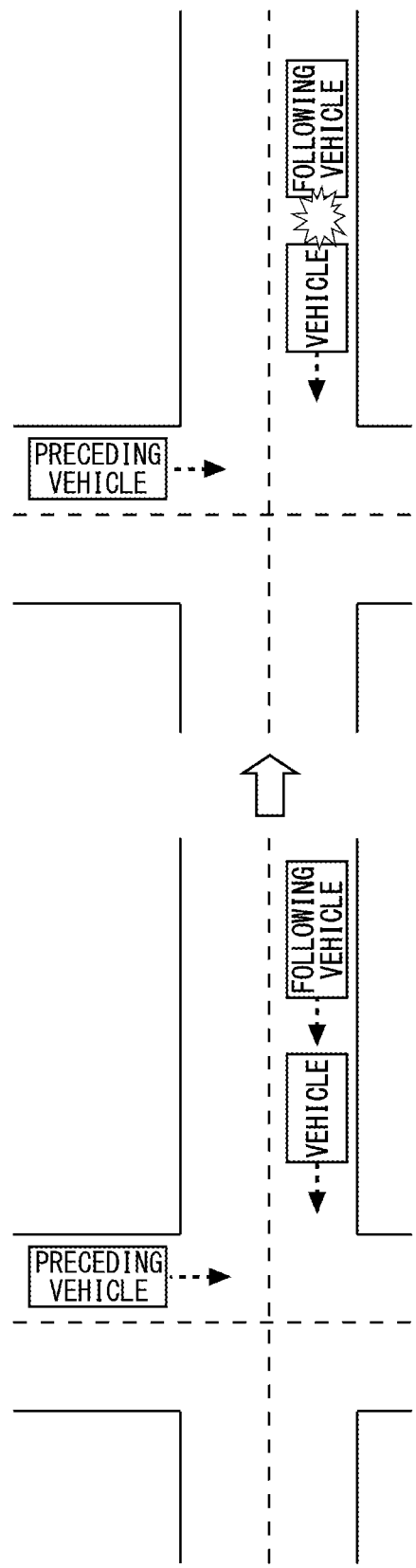
FIG. 5 shows a collision of a vehicle at an intersection.

Incidentally, as shown in FIG. 5, for example, at an intersection with a blind spot, the vehicle may perform sudden braking in order to avoid a collision with a vehicle trying to cross ahead of the vehicle. Even if a driver of the following vehicle noticed the sudden braking of the vehicle ahead of the following vehicle and slammed on the brakes, the following vehicle may not be able to brake in time and the following vehicle may collide with the vehicle ahead of the following vehicle. Therefore, it is desirable to more reliably prevent such a collision of the following vehicle with the vehicle.

On the other hand, in the first embodiment, when the first collision determination unit 3 determines that the vehicle 100 would collide with an obstacle and the second collision determination unit 6 determines that the following vehicle would collide with the vehicle 100, the braking control unit 7 controls the braking apparatus 8 of the vehicle 100 so that the absolute value of the deceleration of the vehicle 100 does not exceed the absolute value of the maximum deceleration of the following vehicle. By doing so, when the vehicle 100 performs braking to avoid a collision with an obstacle ahead, the following vehicle decelerates more than the vehicle 100. Thus, the following vehicle can be more surely prevented from colliding with the vehicle 100.

When the braking control unit 7 receives the first collision signal from the first collision determination unit 3 and the second collision signal from the second collision determination unit 6, the braking control unit 7 controls the braking apparatus 8 of the vehicle 100 so that the absolute value of the deceleration of the vehicle 100 does not exceed the absolute value of the maximum deceleration of the following vehicle.

When the braking control unit 7 receives the first collision signal from the first collision determination means and the second collision signal from the second collision determination unit 6, the braking control unit 7 may change the maximum deceleration of the vehicle 100 to be equal to the maximum deceleration of the following vehicle acquired by the information acquisition unit 5. Alternatively, the braking control unit 7 receives the first collision signal from the first collision determination means and the second collision signal from the second collision determination unit 6, the braking control unit 7 may change the absolute value of the maximum deceleration of the vehicle 100 to a value smaller than the absolute value of the maximum deceleration of the following vehicle acquired by the information acquisition unit 5. By doing so, the following vehicle can be decelerated more than the vehicle 100.

When the braking control unit 7 receives the first collision signal from the first collision determination unit 3 and the second collision signal from the second collision determination unit 6, the braking control unit 7 may control the braking apparatus 8 of the vehicle 100 so that the absolute value of the deceleration of the vehicle 100 does not exceed the absolute value of the maximum deceleration of the following vehicle, and may also control a warning apparatus to issue a warning to an occupant. The warning apparatus warns the occupant by outputting, for example, a warning sound, a warning light, a warning display, a warning vibration, etc.

When the braking control unit 7 receives the first collision signal from the first collision determination unit 3 and the second collision signal from the second collision determination unit 6, the braking control unit 7 controls the braking apparatus 8 of the vehicle 100 so that the absolute value of the deceleration of the vehicle 100 does not exceed the absolute value of the maximum deceleration of the following vehicle, and may activate a safety apparatus such as a seat belt tensioner apparatus. The seat belt tensioner apparatus is configured to restrain an occupant by winding a seat belt for restraining the occupant with a predetermined tensile force.

Figure 6:
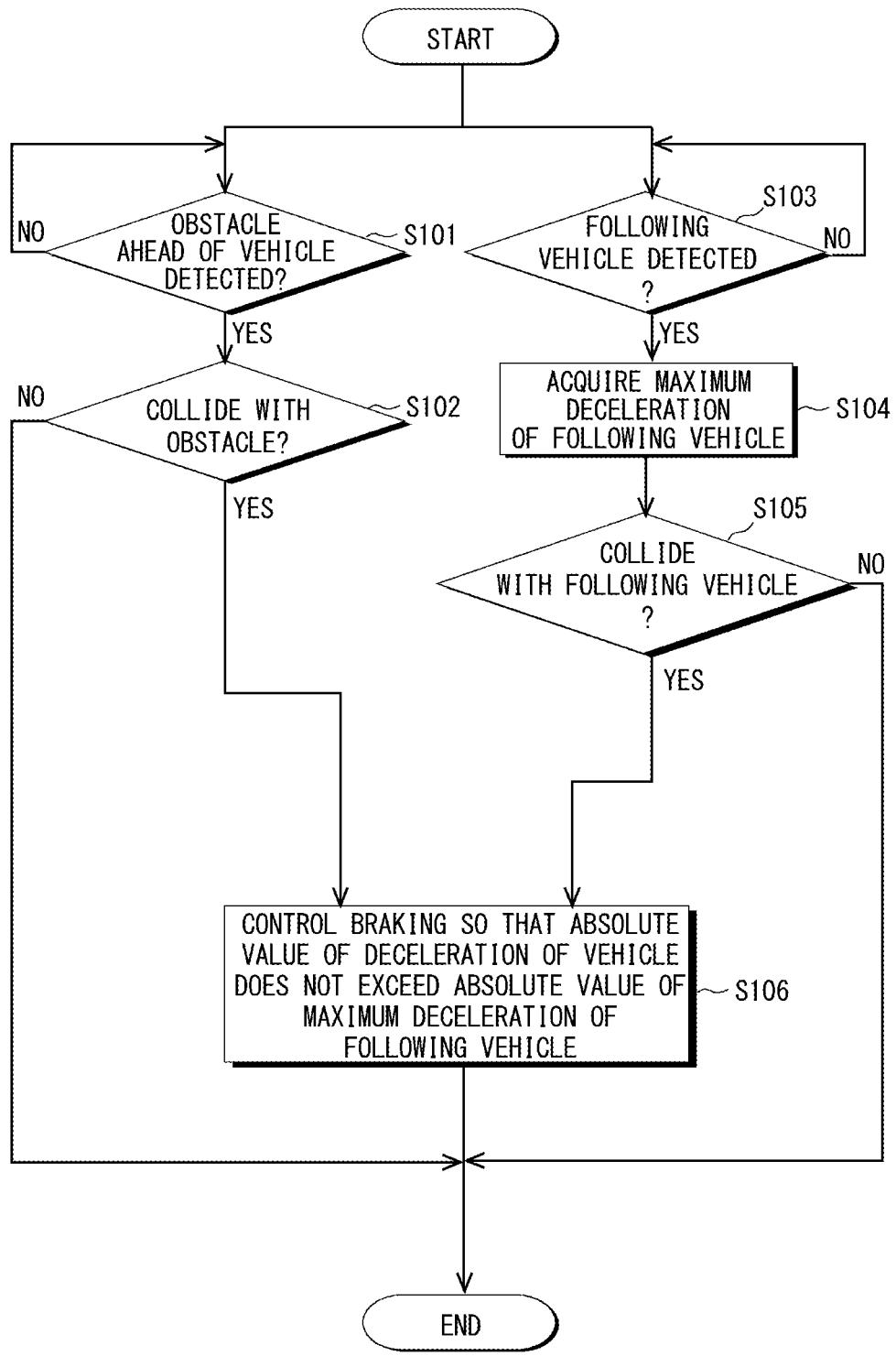
FIG. 6 is a flowchart showing a flow of a braking control method according to the first embodiment.

Next, a braking control method according to the first embodiment will be described. FIG. 6 is a flowchart showing a flow of the braking control method according to the first embodiment. The control processing shown in FIG. 6 may be repeated at predetermined intervals.

When the obstacle detection unit 2 detects an obstacle ahead of the vehicle 100 (YES in Step S101), the first collision determination unit 3 determines whether or not the vehicle 100 would collide with the obstacle ahead of the vehicle 100 based on the detection result from the obstacle detection unit 2 (Step S102). On the other hand, when the obstacle detection unit 2 does not detect an obstacle ahead of the vehicle 100 (NO in Step S101), the detection of this obstacle is repeated.

When the following vehicle detection unit 4 detects the following vehicle traveling behind the vehicle 100 (YES in Step S103), the information acquisition unit 5 acquires the information about the maximum deceleration of the following vehicle from the following vehicle (Step S104). On the other hand, when the following vehicle detection unit 4 does not detect the following vehicle traveling behind the vehicle 100 (NO in Step S103), the detection of the following vehicle is repeated.

The second collision determination unit 6 determines whether or not the following vehicle would collide with the vehicle 100 based on the detection result from the following vehicle detection unit 4 and the information about the maximum deceleration of the following vehicle acquired by the information acquisition unit 5 (Step S105).

When the first collision determination unit 3 determines that the vehicle 100 would collide with the obstacle (YES in Step S102) and the second collision determination unit 6 determines that the following vehicle would collide with the vehicle 100 (YES in Step S105), the braking control unit 7 controls the braking apparatus 8 of the vehicle 100 so that the absolute value of the deceleration of the vehicle 100 does not exceed the absolute value of the maximum deceleration of the following vehicle (Step S106).

If the first collision determination unit 3 determines that the vehicle 100 would not collide with the obstacle ahead of the vehicle 100 (NO in Step S102), the first collision determination unit 3 ends this processing. If the second collision determination unit 6 determines that the following vehicle would not collide with the vehicle 100 (NO in Step S105), the second collision determination unit 6 ends this processing.

In the first embodiment, the braking control unit 7 controls the braking apparatus 8 of the vehicle 100 so that the absolute value of the deceleration of the vehicle 100 does not exceed the absolute value of the maximum deceleration of the following vehicle if the first collision determination unit 3 determines that the vehicle 100 would collide with the obstacle and the second collision determination unit 6 determines that the following vehicle would collide with the vehicle 100. In this way, when the vehicle 100 is braked to avoid a collision with the obstacle ahead, the following vehicle decelerates more than the vehicle 100. Thus, the following vehicle can be more surely prevented from colliding with the vehicle 100.

Second Embodiment

Figure 7:
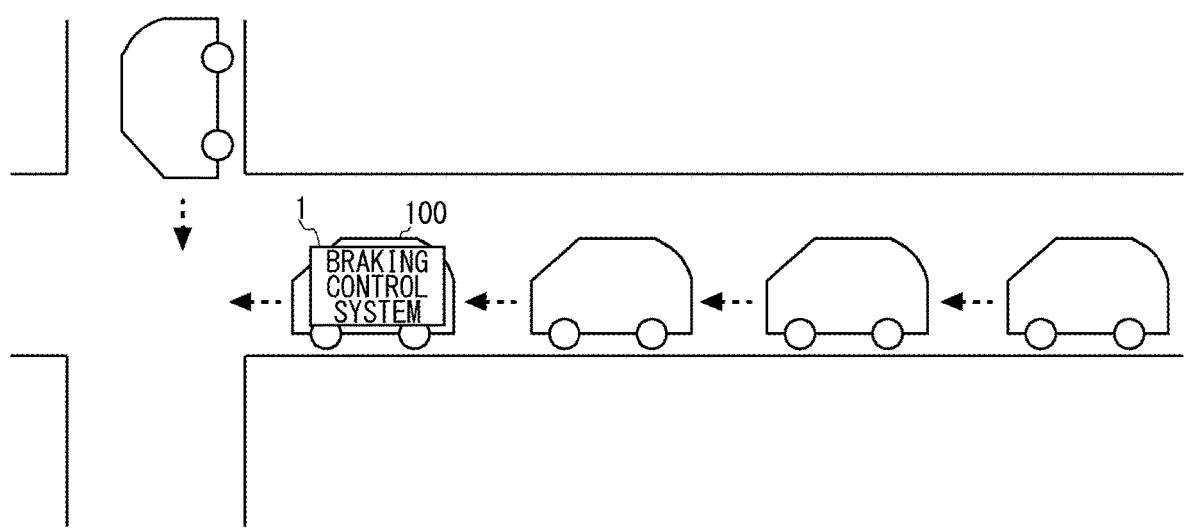
FIG. 7 shows a case where a plurality of following vehicles continuously travel behind the vehicle.

As shown in FIG. 7, the braking control system 1 according to a second embodiment prevents a collision between the vehicle 100 and each of following vehicles even when a plurality of following vehicles continuously travel behind the vehicle 100.

When the first collision determination unit 3 determines that the vehicle 100 would collide with an obstacle, the second collision determination unit 6 determines that the following vehicle would collide with the vehicle 100, and the following vehicle detection unit 4 detects a plurality of the following vehicles continuously traveling behind the vehicle 100, the braking control unit 7 selects a smallest maximum deceleration among the absolute values of the maximum decelerations of the plurality of following vehicles. The braking control unit 7 sets the selected maximum deceleration as the maximum deceleration of the vehicle 100.

By doing so, when the vehicle 100 is braked to avoid a collision with the obstacle ahead of the vehicle 100, each of the following vehicles decelerates more than the vehicle 100. Further, since the vehicle 100 decelerates in accordance with the smallest maximum deceleration among the absolute values of the maximum decelerations, the collision between the following vehicles can be prevented.

For example, the following vehicle detection unit 4 can detect the plurality of following vehicles traveling behind the vehicle 100 based on the following vehicle information acquired by the information acquisition unit 5. The information acquisition unit 5 can acquire information about the plurality of following vehicles traveling behind the vehicle 100 by performing the vehicle-to-vehicle communication, vehicle-to-roadside-infrastructure, etc.

Third Embodiment

Figure 8:
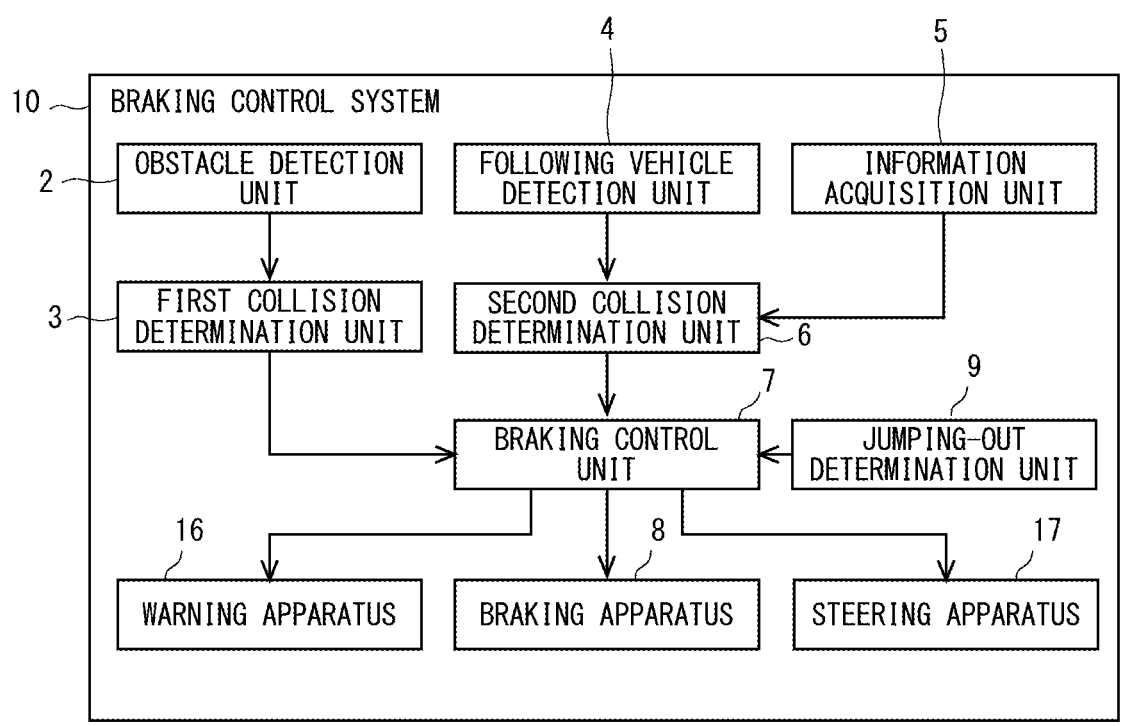
FIG. 8 is a block diagram showing a schematic system configuration of a braking control system according to a second embodiment.

FIG. 8 is a block diagram showing a schematic system configuration of a braking control system according to a third embodiment. A braking control system 10 according to the third embodiment further includes, in addition to the configuration of the braking control system according to the first embodiment, a jumping-out determination unit 9 for determining jumping-out of an obstacle ahead of the vehicle 100.

If the first collision determination unit 3 determines that the vehicle 100 would collide with the obstacle, the second collision determination unit 6 determines that the following vehicle would collide with the vehicle 100, and the jumping-out determination unit 9 determines that the obstacle has jumped out in front of the vehicle 100, the braking control unit 7 controls the braking apparatus 8 of the vehicle 100 so that the absolute value of the deceleration of the vehicle 100 does not exceed the absolute value of the maximum deceleration of the following vehicle, and also controls a warning apparatus 16 to issue a warning to the obstacle.

Further, in the above determination, the braking control unit 7 may control the braking apparatus 8 of the vehicle 100 so that the absolute value of the deceleration of the vehicle 100 does not exceed the absolute value of the maximum deceleration of the following vehicle and may also perform at least one of the following two types of control: one type of the control is for issuing the warning by the warning apparatus 16 to the obstacle which has jumped out in front of the vehicle 100; and another type of the control is for operating a steering apparatus 17 so as to automatically avoid the obstacle which has jumped out in front of the vehicle 100.

Thus, even if the vehicle 100 is controlled so that the absolute value of the deceleration of the vehicle 100 does not exceed the absolute value of the maximum deceleration of the following vehicle when the obstacle suddenly runs out in front of the vehicle 100, a collision between the obstacle and the vehicle 100 can be more surely avoided.

The jumping-out determination unit 9 is a specific example of jumping-out determination means. The jumping-out determination unit 9 determines whether or not the obstacle detected by the obstacle detection unit 2 has jumped out in front of the vehicle 100. Examples of the obstacles jumping out in front of the vehicle 100 include a vehicle on which a communication apparatus is not mounted, a person, a bicycle, an animal, etc.

For example, the jumping-out determination unit 9 may determine whether or not the obstacle jumping out in front of the vehicle 100 has jumped out in front of the vehicle 100 based on an image of the obstacle detected by the obstacle detection unit 2. The jumping-out determination unit 9 may cause a learning device to perform machine learning on the image of the obstacle when the obstacle runs out in advance, and may determine whether or not the obstacle runs out in front of the vehicle 100 using the machine learned learning device.

The jumping-out determination unit 9 performs the machine learning by using the learning device. The learning device is composed of, for example, a neural network such as an RNN (Recurrent Neural Network). The RNN may include an LSTM (Long Short Term Memory) in an intermediate layer. The learning device may be composed of another learning device such as an SVM (Support Vector Machine) instead of a neural network.

The warning apparatus 19 is, for example, a horn of the vehicle for outputting a warning sound to the obstacle, a headlight of the vehicle for lighting or flashing a warning light, and the like.

Although several embodiments of the disclosure have been described, these embodiments are presented by way of example and are not intended to limit the scope of the disclosure. These new embodiments may be implemented in various other forms, and various omissions, substitutions, and modifications may be made without departing from the spirit of the disclosure. These embodiments and modifications thereof are included in the scope and the gist of the disclosure, and are also included in the scope equivalent to the claimed disclosure.

For example, in the present disclosure, the processing shown in FIG. 5 may be implemented by causing a processor to execute a computer program.

The program includes instructions (or software codes) that, when loaded into a computer, cause the computer to perform one or more of the functions described in the embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disc (DVD), Blu-ray disc or other optical disc storage, magnetic cassettes, magnetic tape, magnetic disk storage or other magnetic storage devices.

The program may be transmitted on a transitory computer readable medium or a communication medium. By way of example, and not limitation, transitory computer readable media or communication media can include electrical, optical, acoustical, or other form of propagated signals.

The components constituting the braking control system 1 according to each of the embodiments described above can be realized not only by a program but also partially or wholly by dedicated hardware such as an ASIC (Application Specific Integrated Circuit) or an FPGA (Field-Programmable Gate Array).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A braking control system comprising:
  an obstacle detection means for detecting an obstacle ahead of a vehicle;
  a first collision determination means for determining whether or not the vehicle would collide with the obstacle ahead of the vehicle based on a result of the detection from the obstacle detection means;
  a following vehicle detection means for detecting a following vehicle traveling behind the vehicle;
  an information acquisition means for acquiring information about a maximum deceleration set in the following vehicle;
  a second collision determination means for determining whether or not the following vehicle would collide with the vehicle based on the result of the detection from the following vehicle detection means and the information about the maximum deceleration of the following vehicle acquired by the information acquisition means; and a braking control means for controlling braking means of the vehicle so that an absolute value of a deceleration of the vehicle does not exceed an absolute value of the maximum deceleration of the following vehicle acquired by the information acquisition means when the first collision determination means determines that the vehicle would collide with the obstacle and the second collision determination means determines that the following vehicle would collide with the vehicle.

2. The braking control system according to claim 1, wherein when the first collision determination means determines that the vehicle would collide with the obstacle and the second collision determination means determines that the following vehicle would collide with the vehicle, the braking control means sets the absolute value of the maximum deceleration of the vehicle to be equal to or less than the absolute value of the maximum deceleration of the following vehicle acquired by the information acquisition means.

3. The braking control system according to claim 1, wherein when the first collision determination means determines that the vehicle would collide with the obstacle, the second collision determination means determines that the following vehicle would collide with the vehicle, and the following vehicle detection means detects a plurality of following vehicles traveling behind the vehicle, the braking control means selects a smallest maximum deceleration among the absolute values of the maximum decelerations of the following vehicles, and sets the selected maximum deceleration as the maximum deceleration of the vehicle.

4. The braking control system according to claim 1, further comprising jumping-out determination means for determining whether or not the obstacle ahead of the vehicle detected by the obstacle detection means is jumping out in front of the vehicle, wherein when the first collision determination means determines that the vehicle would collide with the obstacle, the second collision determination means determines that the following vehicle would collide with the vehicle, and the jumping-out determination means determines that the obstacle has jumped out, the braking control means controls the braking means of the vehicle so that the absolute value of the deceleration of the vehicle does not exceed the absolute value of the maximum deceleration of the following vehicle acquired by the information acquisition means and also performs at least one of the following two types of control: one type of the control is for controlling a warning apparatus to issue a warning to the obstacle which has jumped out; and another type of the control is for operating a steering apparatus so as to automatically avoid the obstacle which has jumped out.

5. A braking control method comprising:
detecting an obstacle ahead of a vehicle;
determining whether or not the vehicle would collide with the obstacle ahead of the vehicle based on a result of the detection;
detecting a following vehicle traveling behind the vehicle;
acquiring information about a maximum deceleration set in the following vehicle;
determining whether or not the following vehicle would collide with the vehicle based on the result of the detection and the acquired information about the maximum deceleration of the following vehicle; and
controlling braking means of the vehicle so that an absolute value of a deceleration of the vehicle does not exceed an absolute value of the acquired maximum deceleration of the following vehicle when it is determined that the vehicle would collide with the obstacle and that the following vehicle would collide with the vehicle.

6. A non-transitory computer readable medium storing a program for causing a computer to execute processing of:
detecting an obstacle ahead of a vehicle;
determining whether or not the vehicle would collide with the obstacle ahead of the vehicle based on a result of the detection;
detecting a following vehicle traveling behind the vehicle;
acquiring information about a maximum deceleration set in the following vehicle;
determining whether or not the following vehicle would collide with the vehicle based on the result of the detection and the acquired information about the maximum deceleration of the following vehicle; and
controlling braking means of the vehicle so that an absolute value of a deceleration of the vehicle does not exceed an absolute value of the acquired maximum deceleration of the following vehicle when it is determined that the vehicle would collide with the obstacle and that the following vehicle would collide with the vehicle.

7. A braking control system comprising:
an obstacle detector configured to detect an obstacle ahead of a vehicle;
a first collision determination unit configured to determine whether or not the vehicle would collide with the obstacle ahead of the vehicle based on a result of the detection from the obstacle detector;
a following vehicle detector configured to detect a following vehicle traveling behind the vehicle;
an information acquisition unit configured to acquire information about a maximum deceleration set in the following vehicle;
a second collision determination unit configured to determine whether or not the following vehicle would collide with the vehicle based on the result of the detection from the following vehicle detector and the information about the maximum deceleration of the following vehicle acquired by the information acquisition unit; and
a braking controller configured to control a brake of the vehicle so that an absolute value of a deceleration of the vehicle does not exceed an absolute value of the maximum deceleration of the following vehicle acquired by the information acquisition unit when the first collision determination unit determines that the vehicle would collide with the obstacle and the second collision determination unit determines that the following vehicle would collide with the vehicle.

* * * * *